United States Patent
Toma et al.

(10) Patent No.: US 9,114,422 B1
(45) Date of Patent: Aug. 25, 2015

(54) PAVING BLOCK WITH EMBEDDED PHOTOLUMINESCENT MATERIAL

(71) Applicants: Alaa Toma, West Bloomfield, MI (US); Jeremy P. Eckhous, West Bloomfield, MI (US); John Ketty, West Bloomfield, MI (US)

(72) Inventors: Alaa Toma, West Bloomfield, MI (US); Jeremy P. Eckhous, West Bloomfield, MI (US); John Ketty, West Bloomfield, MI (US)

( * ) Notice: Subject to any disclaimer, the term of this patent is extended or adjusted under 35 U.S.C. 154(b) by 13 days.

(21) Appl. No.: 14/255,462

(22) Filed: Apr. 17, 2014

(51) Int. Cl.
*B05D 3/00* (2006.01)
*B29C 39/00* (2006.01)

(52) U.S. Cl.
CPC .............. *B05D 3/002* (2013.01); *B29C 39/003* (2013.01)

(58) Field of Classification Search
CPC ...................................................... E01F 9/002
See application file for complete search history.

(56) References Cited

U.S. PATENT DOCUMENTS

| | | | |
|---|---|---|---|
| 5,472,737 A | 12/1995 | Anders | |
| 6,005,024 A | 12/1999 | Anders et al. | |
| 6,027,280 A | 2/2000 | Conners et al. | |
| 6,665,986 B1 * | 12/2003 | Kaplan | 52/102 |
| 7,364,615 B1 * | 4/2008 | Bryant | 106/814 |
| 8,617,638 B2 * | 12/2013 | Hill | 427/64 |
| 2006/0065879 A1 | 3/2006 | Beimel | |
| 2009/0262514 A1 * | 10/2009 | Sturley | 362/34 |

* cited by examiner

*Primary Examiner* — Nathan T Leong
(74) *Attorney, Agent, or Firm* — Donald J. Ersler

(57) ABSTRACT

A paving block with embedded photoluminescent material preferably includes a cast concrete base and fragments of a photoluminescent material. The cast concrete base is created by combining sand, aggregate and cement to form an uncured concrete mixture. The photoluminescent layer may be created from a polyester resin infused with a photoluminescent pigment or a silica-based glass material infused with photoluminescent pigment. The fragments of photoluminescent material are embedded in a top of the cast concrete base. Further, a light transmitting cover may be attached over the photoluminescent material.

20 Claims, 2 Drawing Sheets

PAVING BLOCK WITH EMBEDDED PHOTOLUMINESCENT MATERIAL

BACKGROUND OF THE INVENTION

1. Field of the Invention

The present invention relates generally to outdoor surface construction and more specifically to a paving block with embedded photoluminescent material, which provides illumination without the need for electrical power.

2. Discussion of the Prior Art

Paving blocks are used for walkways, large public pedestrian areas, driveways, paths and the like. The paving blocks allow ground action without deterioration. Paving blocks, like cement blocks for pathways, can be laid in various patterns that are aesthetically pleasing. Walkway lighting for pathways have been used along with paving blocks to increase safety, provide sure footing and visibility. Many walkways are illuminated with low or medium voltage lighting, and must be furnished with low- or medium voltage electricity to power an illumination system. There are electrical consumption costs associated with the use of illumination systems. There are also difficulties in setup of the illumination system, if the walkway is a long walkway or is located at a distance from an electrical connection. A licensed contractor must be hired to install electrical supplies for the illumination system.

The use of outdoor lighting is known in the prior art. For example, U.S. Pat. No. 6,027,280 to Connors et. al (Connors) discloses an interlocking paving block with interior illumination capability. However Conners does not allow for non-electrical use of an outdoor light. Similarly, U.S. Pat. No. 5,472,737 to Anders (Anders 737) discloses a photoluminescent highway paint composition that is painted on highways to aid in driving. However, Anders 737 does not disclose the use of paving blocks. Lastly, U.S. Pat. No. 6,005,024 to Anders et al (Anders 024) discloses a photoluminescent overlay that covers existing signs and gives moisture stability to the phosphorescent materials. However, Anders 024 does not disclose the use of paving blocks.

While the above-described devices fulfill their respective objections and requirements, the aforementioned patents do not describe a photoluminescent paving block that allows for being used for outdoor lighting. Connors makes no provision for non-electrical use, since it includes an insect bulb and wiring. Anders 737 and 024 only disclose the use of photoluminescent material in conjunction with paving blocks.

Additionally, U.S. Pat. No. 6,665,986 to Kaplan discloses a phosphorescent paving block. Patent publication no. 2006/0065879 to Beimel discloses a luminous cementitious composition and methods of making and using the same. U.S. Pat. No. 8,617,638 to Hill discloses a method of manufacturing photoluminescent pavers at a paver manufacturing facility.

Accordingly, there is a clearly felt need in the art for a paving block with embedded photoluminescent material, which provides illumination without the need for electrical power.

SUMMARY OF THE INVENTION

The present invention provides a paving block with embedded photoluminescent material, which provides illumination without the need for electrical power. The paving block with embedded photoluminescent material (luminescent paving block) preferably includes a cast concrete base and fragments of a photoluminescent material. The cast concrete base is created by combining sand, aggregate and cement to form an uncured concrete mixture. The photoluminescent layer may be created from a polyester resin infused with a photoluminescent pigment or a silica-based glass material infused with photoluminescent pigment. The fragments of photoluminescent material are embedded in a top of the cast concrete base. Further, a light transmitting cover may be placed over the photoluminescent material.

Accordingly, it is an object of the present invention to provide a luminescent paving block, which has all of the advantages of the prior art for outdoor lighting and none of the disadvantages.

It is further object of the present invention to provide a luminescent paving block, which may be easily and efficiently manufactured and marketed.

It is yet a further object of the present invention to provide a luminescent paving block, which has a low cost of manufacture with regard to both materials and labor.

It is yet a further object of the present invention to provide a luminescent paving block, which requires no wiring, no electrical power consumption and no installation by an electrical contractor.

Finally, it is another object of the present invention to provide a luminescent paving for outdoor lighting that is aesthetically pleasing.

These and additional objects, advantages, features and benefits of the present invention will become apparent from the following specification.

DETAILED DESCRIPTION OF THE PREFERRED EMBODIMENTS

Figure 2:
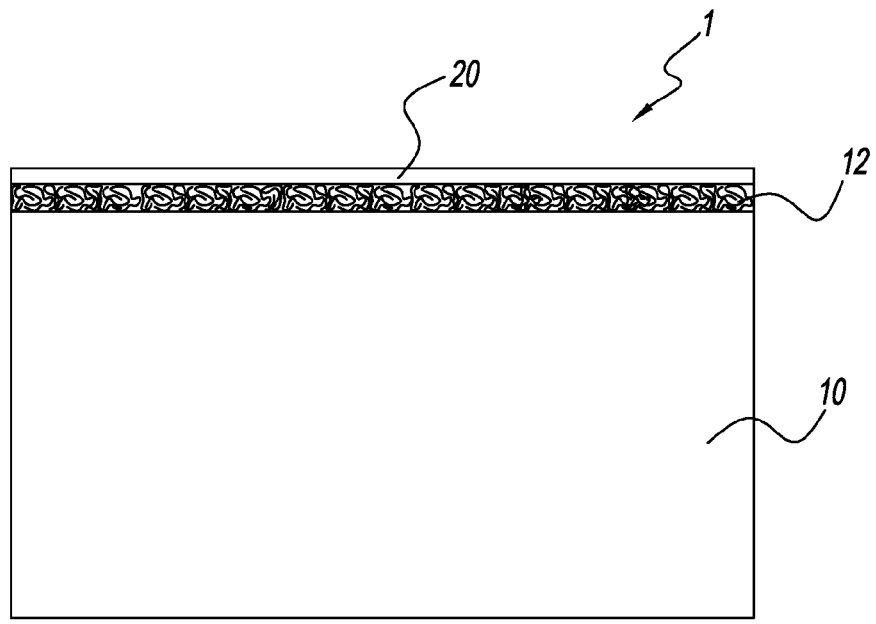
FIG. 2 is a side view of a luminescent paving block in accordance with the present invention.

With reference now to the drawings, and particularly to FIG. 2, there is shown a side view of a luminescent paving block 1. The luminescent paving block 1 includes a cast concrete base 10 and a photoluminescent layer 12. The photoluminescent layer 12 may be created from a polyester resin infused with a photoluminescent pigment or a silica-based glass material infused with photoluminescent pigment. The photoluminescent pigment includes strontium aluminate doped with europium. The polyester resin is mixed with the strontium aluminate pigment to form a polyester resin mixture. The polyester resin is mixed with the strontium aluminate pigment to form an evenly distributed suspension, and is poured into shallow forms to cure and harden. When the polyester resin mixture is fully cured, the hardened polyester resin mixture is crushed in a hammer-mill or with any other suitable device to create a mixture of randomly sized chips or particles to form polyester resin mixture fragments 14.

The silica-based glass material is mixed with the strontium aluminate pigment to form a silica-based glass mixture. The silica-based glass is mixed with the strontium aluminate pigment to form an evenly distributed suspension, and is poured into shallow forms in preparation of firing in a glass kiln. After the silica-based glass mixture is fully fired, the glass is allowed to cure and harden. The fully cooled and cured silica-based glass mixture is then crushed with a hammer-mill or with any other suitable device to create a mixture of randomly sized chips or particles to form silica-based glass fragments 16.

Figure 4:
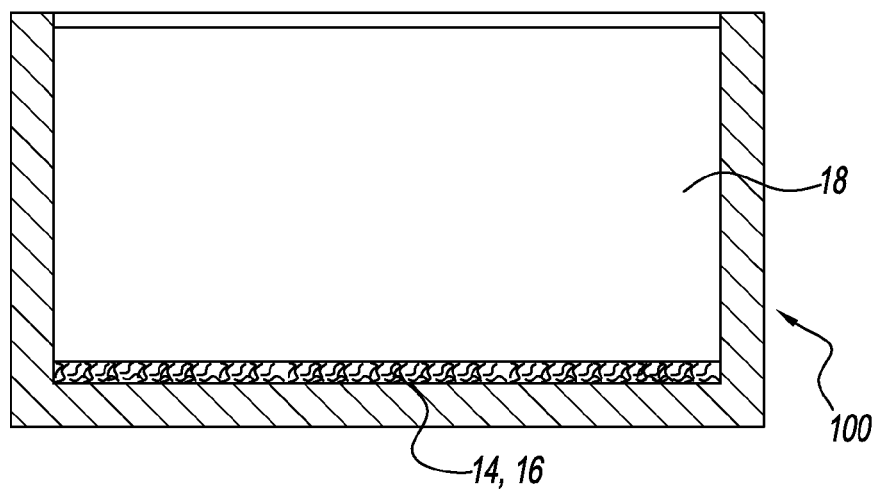
FIG. 4 is a cross sectional view of a luminescent paving block cast in a paving block mold in accordance with the present invention.

With reference to FIG. 4, either the polyester resin mixture fragments 14 or the silica-based glass fragments 16 are placed on a bottom of the paving mold block mold 100. The following weights of materials is given by way of example and not by way of limitation. A small amount of the polyester resin mixture fragments 14 having a preferable weight of 25-30 grams is evenly distributed on a bottom of the paving block mold 100; or a small amount of the silica-based glass fragments 16 having a preferable weight of 40-50 grams is evenly distributed on a bottom of the paving block mold 100.

The cast concrete base 10 is created by combining sand, aggregate and cement to form an uncured concrete mixture 18. The uncured concrete mixture 18 is poured into a paving block mold 100, until thereof is substantially filled. The paving block mold 100 is then shaken on a shaker table. The shaker table is a device well known in the art, which is designed to agitate the uncured concrete mixture 18 to drive out any gaps, voids or air spaces. Next, the contents in the paving block mold 100 undergo compression. The contents of the paving block mold 100 are compressed with a hydraulic press to further drive out any gaps or voids, and to enhance durability of the cast concrete block 10 to enhance its ability to withstand rated loads and environmental forces.

Figure 1:
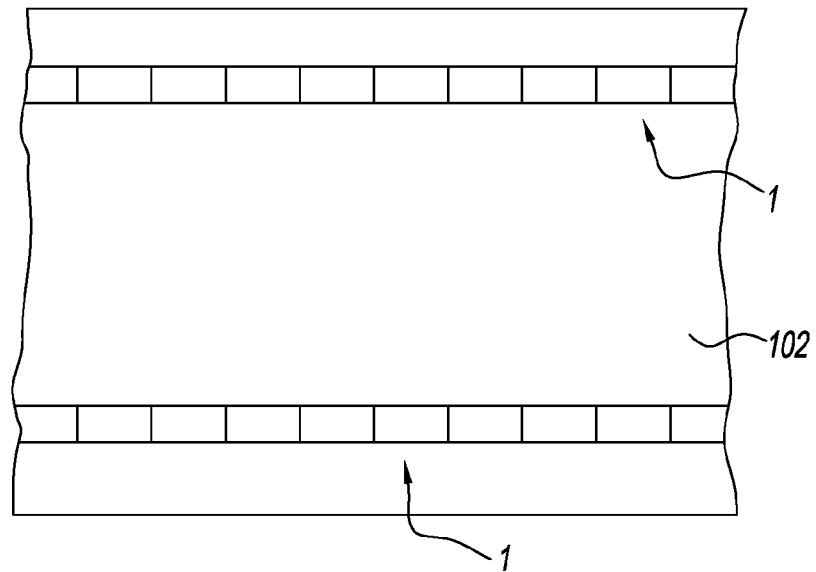
FIG. 1 is a top view of a path lined with a plurality of luminescent paving blocks in accordance with the present invention.
Figure 3:
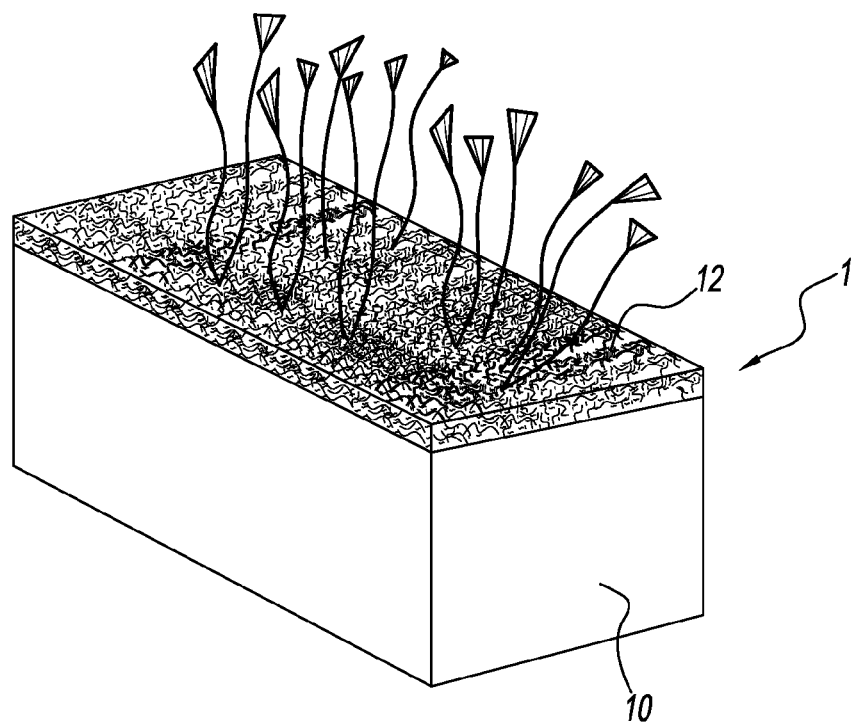
FIG. 3 is a perspective view of a luminescent paving block reflecting light in accordance with the present invention.

Additionally, the cast concrete block 10 is allowed to cure for up to 28 days in a controlled environment. Finally, when fully dry and cured, the paving block 1 is subjected to a light surface grinding, which removes excess concrete material from a top surface and exposes the polyester resin mixture fragments 14 or the silica-based glass fragments 16 on the surface the paving block 1. With reference to FIG. 3, a light transmissive sealant 20 including a methyl methacrylate or polyurethane material may be applied in the form of spray, after the paving block 1 is ground. The light transmissive sealant 20 is allowed to dry for 24 hours, before the paving block 1 is ready be to inventoried and shipped. With reference to FIG. 1, a plurality of paving blocks 1 are used to line a path 102.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of manufacturing a paving block with embedded photoluminescent material, comprising the steps of:
    mixing sand, aggregate and cement to form an uncured concrete mixture;
    providing at least one of a photoluminescent mixture of a polyester resin infused with a photoluminescent pigment and a silica-based glass material infused with said photoluminescent pigment;
    curing said photoluminescent mixture, breaking said photoluminescent mixture into randomly sized chips or particles to form photoluminescent fragments;
    providing a paving block mold;
    placing said photoluminescent fragments in a bottom of said paving block mold;
    pouring said uncured concrete mixture over said photoluminescent fragments to substantially fill said paving block mold; and
    shaking said paving block mold.

2. The method of manufacturing a paving block with embedded photoluminescent material of claim 1, further comprising the step of:
    allowing said contents in said paving block mold to cure for a set period of time in a controlled environment to form a paving block.

3. The method of manufacturing a paving block with embedded photoluminescent material of claim 2, further comprising the step of:
    grinding a top surface of said paving block to remove excess concrete material and expose a photoluminescent layer.

4. The method of manufacturing a paving block with embedded photoluminescent material of claim 3, further comprising the step of:
    applying a transmissive sealant to cover said photoluminescent layer.

5. The method of manufacturing a paving block with embedded photoluminescent material of claim 1, further comprising the step of:
    pouring said photoluminescent mixture into a shallow form to allow thereof to cure and harden.

6. The method of manufacturing a paving block with embedded photoluminescent material of claim 1, further comprising the step of:
    firing said silica-based glass material infused with said photoluminescent pigment in a kiln.

7. The method of manufacturing a paving block with embedded photoluminescent material of claim 1, further comprising the step of:
    shaking said paving block mold on a shaker table.

8. A method of manufacturing a paving block with embedded photoluminescent material, comprising the steps of:
    mixing sand, aggregate and cement to form an uncured concrete mixture;
    providing at least one of a photoluminescent mixture of a polyester resin infused with a photoluminescent pigment and a silica-based glass material infused with said photoluminescent pigment, said photoluminescent pigment includes strontium aluminate doped with Europium;
    curing said photoluminescent mixture, breaking said photoluminescent mixture into randomly sized chips or particles to form photoluminescent fragments;
    providing a paving block mold;
    placing said photoluminescent fragments in a bottom of said paving block mold;
    pouring said uncured concrete mixture over said photoluminescent fragments to substantially fill said paving block mold; and
    shaking said paving block mold.

9. The method of manufacturing a paving block with embedded photoluminescent material of claim 8, further comprising the step of:
    allowing said contents in said paving block mold to cure for a set period of time in a controlled environment to form a paving block.

10. The method of manufacturing a paving block with embedded photoluminescent material of claim 9, further comprising the step of:
    grinding a top surface of said paving block to remove excess concrete material and expose a photoluminescent layer.

11. The method of manufacturing a paving block with embedded photoluminescent material of claim 10, further comprising the step of:

applying a transmissive sealant to cover said photoluminescent layer.

12. The method of manufacturing a paving block with embedded photoluminescent material of claim 8, further comprising the step of:
    pouring said photoluminescent mixture into a shallow form to allow thereof to cure and harden.

13. The method of manufacturing a paving block with embedded photoluminescent material of claim 8, further comprising the step of:
    firing said silica-based glass material infused with said photoluminescent pigment in a kiln.

14. The method of manufacturing a paving block with embedded photoluminescent material of claim 8, further comprising the step of:
    shaking said paving block mold on a shaker table.

15. A method of manufacturing a paving block with embedded photoluminescent material, comprising the steps of:
    mixing sand, aggregate and cement to form an uncured concrete mixture;
    providing at least one of a photoluminescent mixture of a polyester resin infused with a photoluminescent pigment and a silica-based glass material infused with said photoluminescent pigment;
    curing said photoluminescent mixture, breaking said photoluminescent mixture into randomly sized chips or particles to form photoluminescent fragments;
    providing a paving block mold;
    placing said photoluminescent fragments in a bottom of said paving block mold;
    pouring said uncured concrete mixture over said photoluminescent fragments to substantially fill said paving block mold;
    shaking said paving block mold; and
    compressing contents in said paving block mold.

16. The method of manufacturing a paving block with embedded photoluminescent material of claim 15, further comprising the step of:
    allowing said contents in said paving block mold to cure for a set period of time in a controlled environment to form a paving block.

17. The method of manufacturing a paving block with embedded photoluminescent material of claim 16, further comprising the step of:
    grinding a top surface of said paving block to remove excess concrete material and expose a photoluminescent layer.

18. The method of manufacturing a paving block with embedded photoluminescent material of claim 17, further comprising the step of:
    applying a transmissive sealant to cover said photoluminescent layer.

19. The method of manufacturing a paving block with embedded photoluminescent material of claim 15, further comprising the step of:
    pouring said photoluminescent mixture into a shallow form to allow thereof to cure and harden.

20. The method of manufacturing a paving block with embedded photoluminescent material of claim 15, further comprising the step of:
    firing said silica-based glass material infused with said photoluminescent pigment in a kiln.

\* \* \* \* \*